July 3, 1923.
M. J. MOORE
1,460,554
DEVICE FOR CARRYING BASKETS AND THE LIKE
Filed March 1, 1922
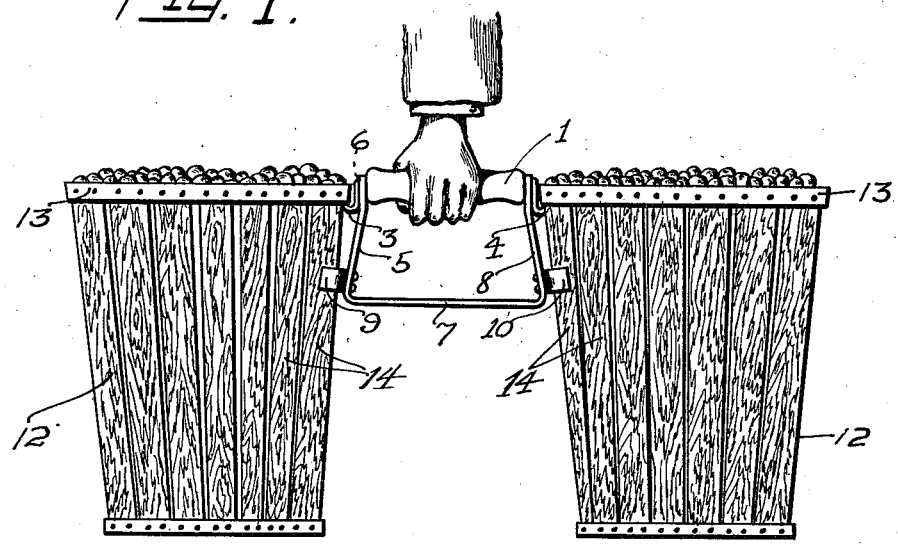
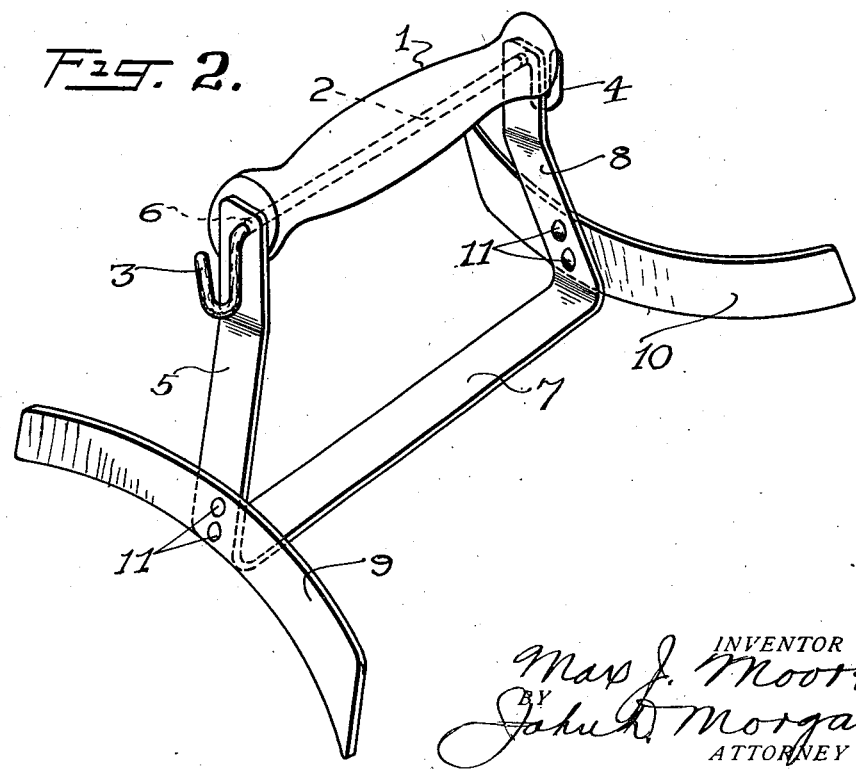
INVENTOR
Max J. Moore
BY John D. Morgan
ATTORNEY Patented July 3, 1923.

1,460,554

UNITED STATES PATENT OFFICE.

MAX J. MOORE, OF NEWARK, NEW JERSEY, ASSIGNOR TO WALTER H. COLLINS, OF SUMMIT, NEW JERSEY.

DEVICE FOR CARRYING BASKETS AND THE LIKE.

Application filed March 1, 1922. Serial No. 540,215.

*To all whom it may concern:*

Be it known that I, MAX J. MOORE, a citizen of the United States, residing at Newark, in the county of Essex and State of New Jersey, have made certain new and useful Improvements in Devices for Carrying Baskets and the like, of which the following is a specification.

The invention relates to a novel and useful device for carrying a plurality of baskets and the like.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation showing the device in use carrying two baskets; and

Fig. 2 is an enlarged perspective of the device.

The invention in certain of its aspects is especially adapted as a carrier for a plurality of fruit baskets and the like but it is applicable also for carrying a plurality of other kinds of containers and the like.

The invention comprises in conjunction with a handle a member at either end thereof passing into supporting engagement with a basket, container, or the like, by a simple movement of the entire device, and a member which at the same time passes into positioning and steadying relation with the engaged basket or the like.

More in detail, and as exemplarily embodied, there is a handle having a hook at either end, shaped to engage by a simple upward movement with the basket structure, this movement bringing the positioning and steadying members into proper engagement with the baskets, said members being shaped to conform to the baskets to hold them against swaying, twisting, or other undesirable movement.

As embodied, a handle 1 is centrally longitudinally apertured, and a metal rod 2 extends through the aperture and at either end of the handle it is shaped into or provided with devices for engaging by a simple movement of the handle with the fruit baskets or other articles to be carried, so that the baskets will be securely supportably engaged thereby. As embodied, these members are formed as hooks 3 and 4, integral with the wire 2, and bent first downwardly and then upwardly from the ends of the handle.

Means are likewise provided in conjunction with the supporting means for positioning and steadying the baskets or the like, so that they will remain stationary and be kept from swaying or twisting upon the hooks or other supports.

As embodied, a frame of strip metal is provided extending downwardly from the handle and then along, but spaced away from, the handle and returning upwardly thereto, and supported by the handle at either end. For this purpose, the upper end of the downwardly-extending reach 5 is provided with an aperture 6 through which the rod 2 passes just as it is bent downwardly to form the hook 3, the upper end of the part 5 being thus supported and also held securely in position between the end of the handle and the hook. The strip is then bent into a horizontally disposed reach 7, and into an upwardly extending reach 8, the latter having the same relation to the other end of the handle 1 and the hook 4 as that already described.

The supporting and steadying members, as embodied, comprise two horizontally disposed, arcuate members 9 and 10, fixed respectively to the bottom parts of the respective reaches 5 and 8 of the supporting frame, by suitable means, such as rivets 11. In this instance the frame and the members 9 and 10 are shaped and proportioned to conform to a standard size and shape of fruit basket 12, as shown in Fig. 1, and it will be understood that these may be varied to suit different forms of baskets or other containers.

As shown in Fig. 1, the hooks 3 and 4 will pass inwardly and upwardly from beneath the underside of the top hoop or annular binder 13, at the top of the basket 12, passing between two adjacent longitudinally-disposed staves or shooks 14, as shown in Fig. 1. This is effected by a simple movement of the hand as the baskets stand on the floor or ground. At the same time the positioning and steadying members 9 and 10 are brought against the sides of the basket. Thus the two baskets are firmly supported, and are prevented from any swinging, swaying or twisting movement with respect to the supporting hooks, which would tend to dislodge the basket or to break, or break loose, the hoops 13. By mearely setting the baskets down and giving a slight downward movement to the handle, the carrier is disengaged from the baskets.

It will be understood that detail changes from the exact structure shown and described may be made within the scope of the accompanying drawings without departing from the principles of the invention and without sacrificing its chief advantages.

What I claim is:—

1. A carrier for fruit baskets and the like including in combination a handle, a device at either end thereof adapted to engage with a basket and basket positioning and steadying members supported from the handle and engaging the sides of the respective baskets at a lower level than said devices.

2. A carrier for fruit baskets and the like including in combination a handle, a hook at either end thereof adapted to engage with a basket and basket positioning and steadying members supported from the handle and engaging the sides of the respective baskets at a lower level than said hooks.

3. A carrier for fruit baskets and the like including in combination a handle, a device at either end thereof adapted to engage with a basket and arcuate basket positioning and steadying members supported from the handle and engaging the sides of the respective baskets at a lower level than said devices.

4. A carrier for fruit baskets and the like including in combination a handle, a hook at either end thereof adapted to engage with a basket and arcuate basket positioning and steadying members supported from the handle and engaging the sides of the respective baskets at a lower level than said hooks.

5. A carrier for fruit baskets and the like including in combination a handle, a hook at either end thereof adapted to engage with a basket, a frame supported by the handle and extending downwardly from one end thereof to a cross reach and upwardly therefrom to the opposite end of the handle, and basket positioning and steadying members at either end and at the bottom of said frame.

6. A carrier for fruit baskets and the like including in combination a handle, a hook at either end thereof adapted to engage with a basket, a frame supported by the handle and extending downwardly from one end thereof to a cross reach and upwardly therefrom to the opposite end of the handle, and arcuate basket positioning and steadying members at either end and at the bottom of said frame.

7. A carrier for fruit baskets and the like including in combination a handle, a device at either end thereof adapted to engage with a basket and basket positioning and steadying members, shaped to conform to the basket, supported from the handle and engaging the sides of the respective baskets at a lower level than said devices.

8. A carrier for fruit baskets and the like including in combination a handle, a hook at either end thereof adapted to engage with a basket and basket positioning and steadying members, shaped to conform to the basket, supported from the handle and engaging the sides of the respective baskets at a lower level than said hooks.

9. A carrier for fruit baskets and the like including in combination a handle, a hook at either end thereof adapted to engage with a basket, a frame supported by the handle and extending downwardly from one end thereof to a cross reach and upwardly therefrom to the opposite end of the handle, and basket positioning and steadying members, shaped to conform to the basket, at either end and at the bottom of said frame.

In testimony whereof, I have signed my name to this specification.

MAX J. MOORE.